United States Patent [19]

Mizuno

[11] Patent Number: 4,604,080
[45] Date of Patent: Aug. 5, 1986

[54] TOOTHED DRIVE BELT

[75] Inventor: Takahide Mizuno, Kobe, Japan

[73] Assignee: Mitsuboshi Belting Ltd., Japan

[21] Appl. No.: 660,009

[22] Filed: Oct. 11, 1984

[30] Foreign Application Priority Data

Oct. 12, 1983 [JP] Japan .................. 58-157501[U]
Oct. 12, 1983 [JP] Japan .................. 58-157502[U]
Oct. 13, 1983 [JP] Japan .................. 58-158780[U]
Oct. 17, 1983 [JP] Japan .................. 58-161108[U]

[51] Int. Cl.[4] ...................... F16G 1/28; F16H 7/02
[52] U.S. Cl. ...................... 474/153; 474/205
[58] Field of Search .............. 474/153, 202, 205, 250

[56] References Cited

U.S. PATENT DOCUMENTS

| | | | |
|---|---|---|---|
| 3,756,091 | 9/1973 | Miller ............................ | 474/153 |
| 4,233,852 | 11/1980 | Bruns ............................ | 474/153 |
| 4,337,056 | 6/1982 | Bruns ............................ | 474/205 X |
| 4,403,979 | 9/1983 | Weijick ......................... | 474/205 X |
| 4,468,211 | 8/1984 | Hoshiro et al. ................ | 474/153 X |

FOREIGN PATENT DOCUMENTS

2085999 5/1982 United Kingdom ............... 474/153

*Primary Examiner*—John M. Jillions
*Attorney, Agent, or Firm*—Wood, Dalton, Phillips, Mason & Rowe

[57] ABSTRACT

A toothed belt drive system wherein either or both of the belt teeth and pulley grooves include, in cross section, elliptical arcuate portions coordinated with circularly arcuate portions in providing resistance to cracking, minimizing of tapping noise by engagement of the belt groove roots with the pulley teeth, smooth withdrawal of the belt from the pulley, and abrasion of the belt groove root portions. The tooth and pulley groove configurations may include rectilinear portions. Preferred angular relationship between the elliptical arc axes and dimensions of the different portions of the belt teeth and pulley groove configurations embodying the invention are disclosed.

19 Claims, 26 Drawing Figures

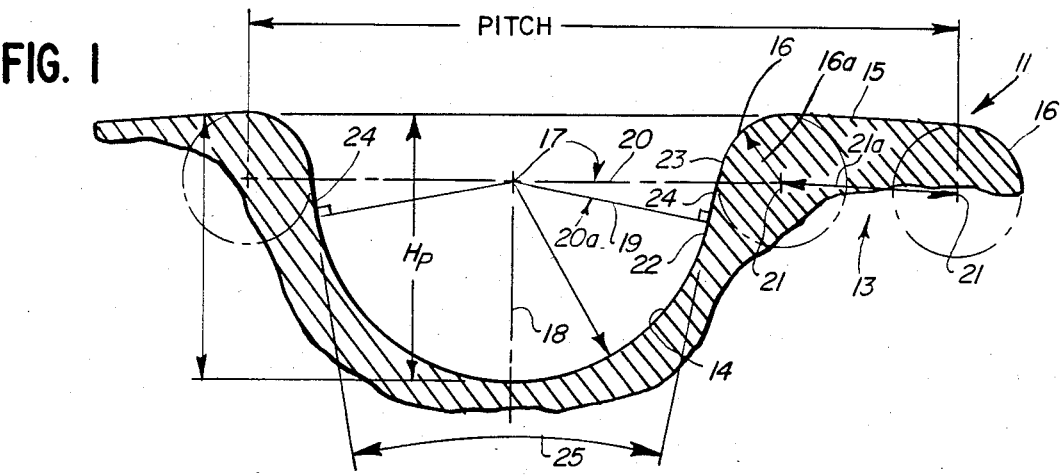
FIG. 1
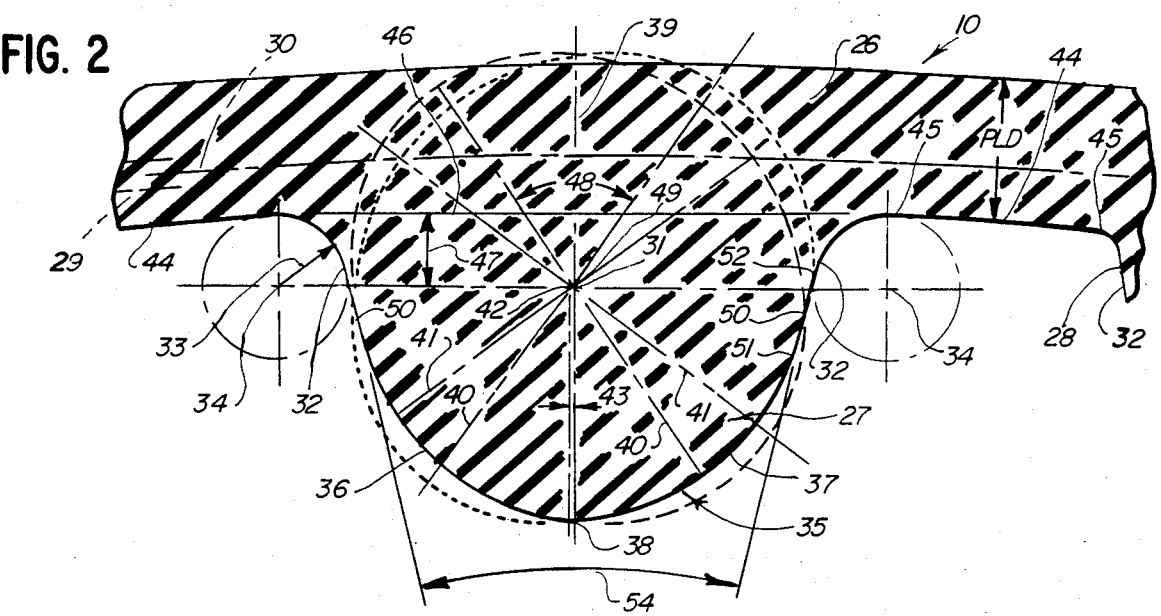
FIG. 2
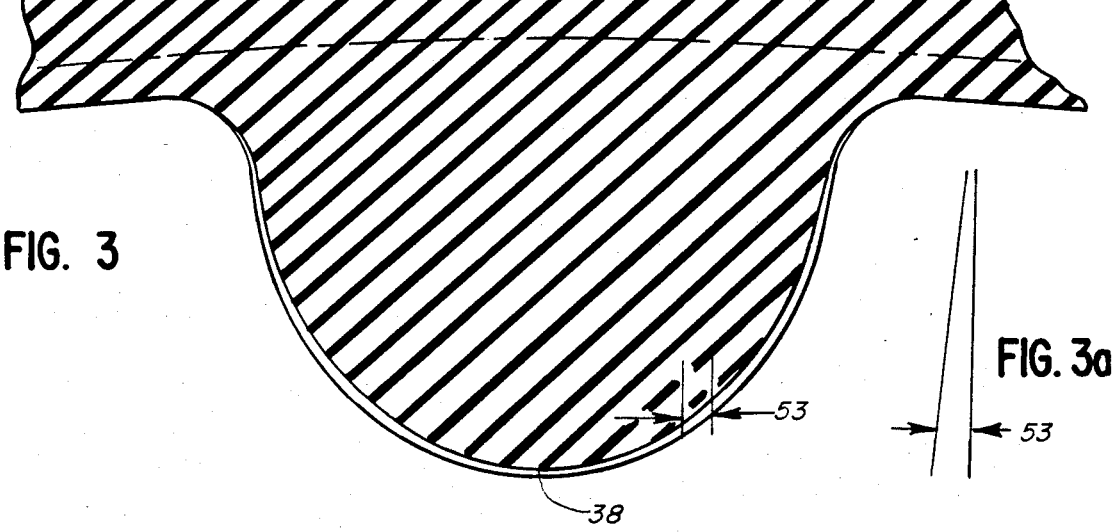
FIG. 3
FIG. 3a

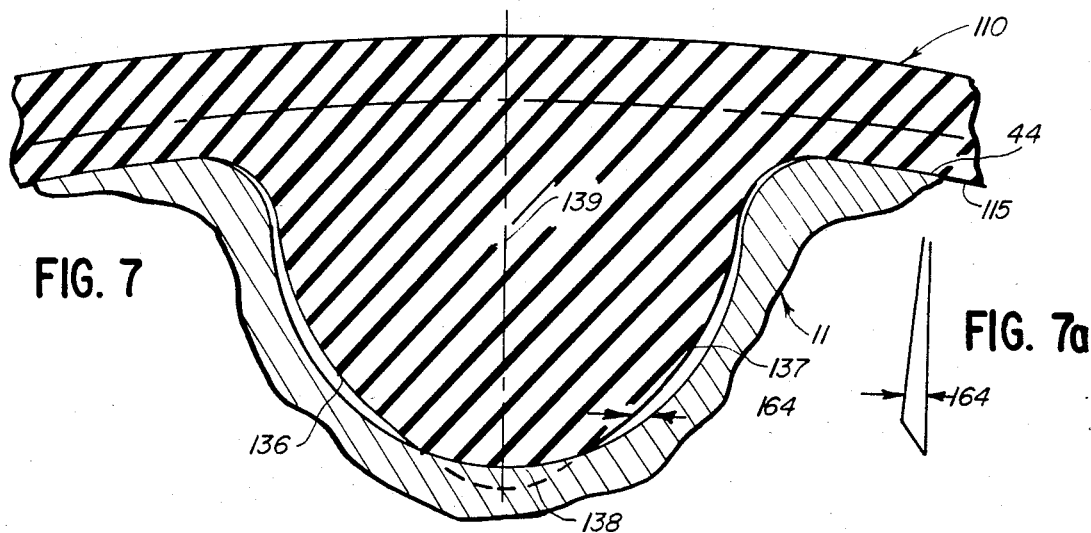
FIG. 7
FIG. 7a
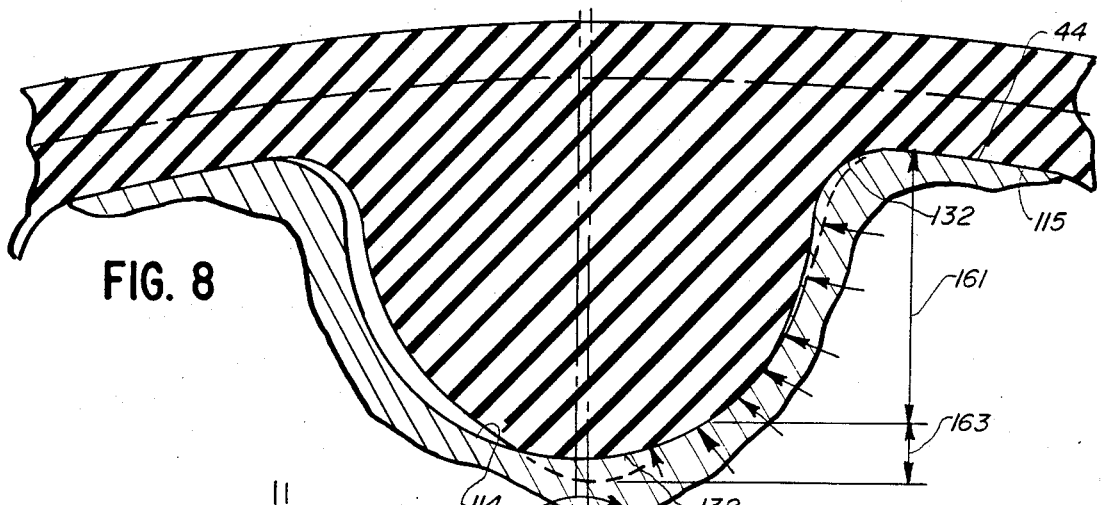
FIG. 8
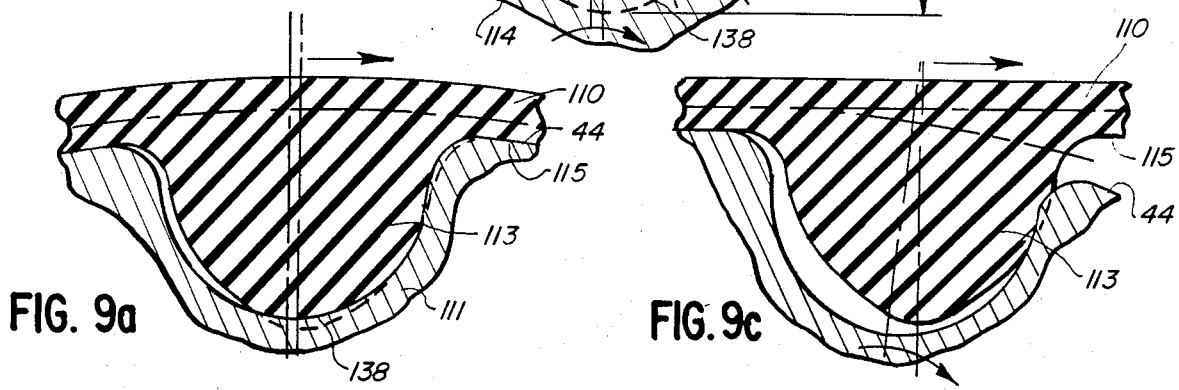
FIG. 9a
FIG. 9c
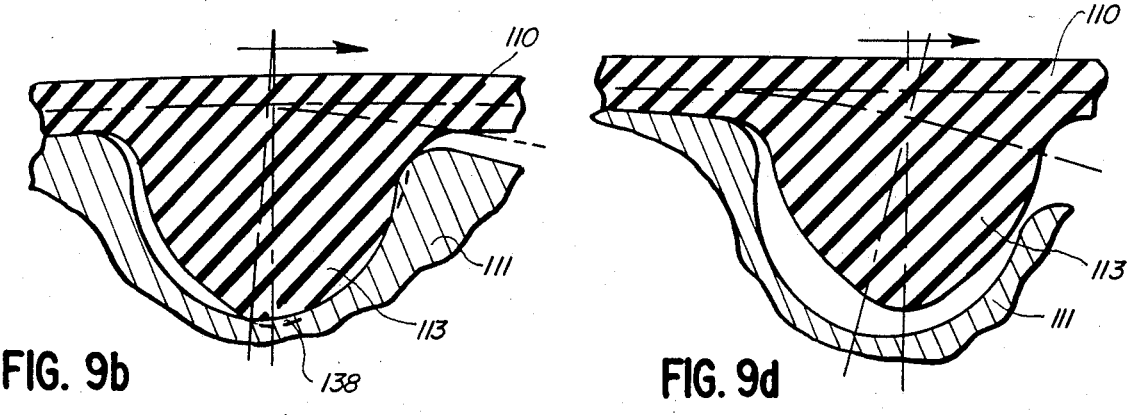
FIG. 9b
FIG. 9d

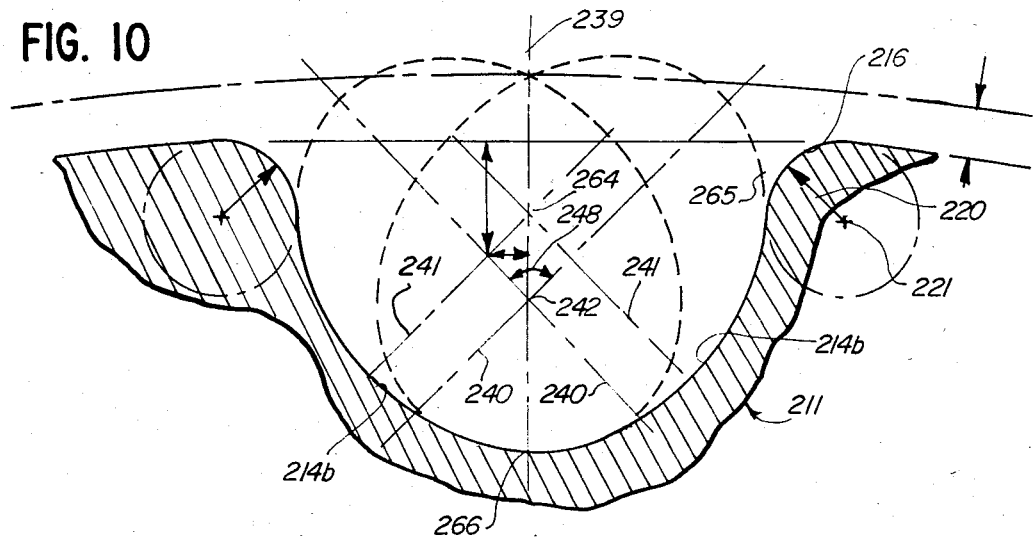
FIG. 10
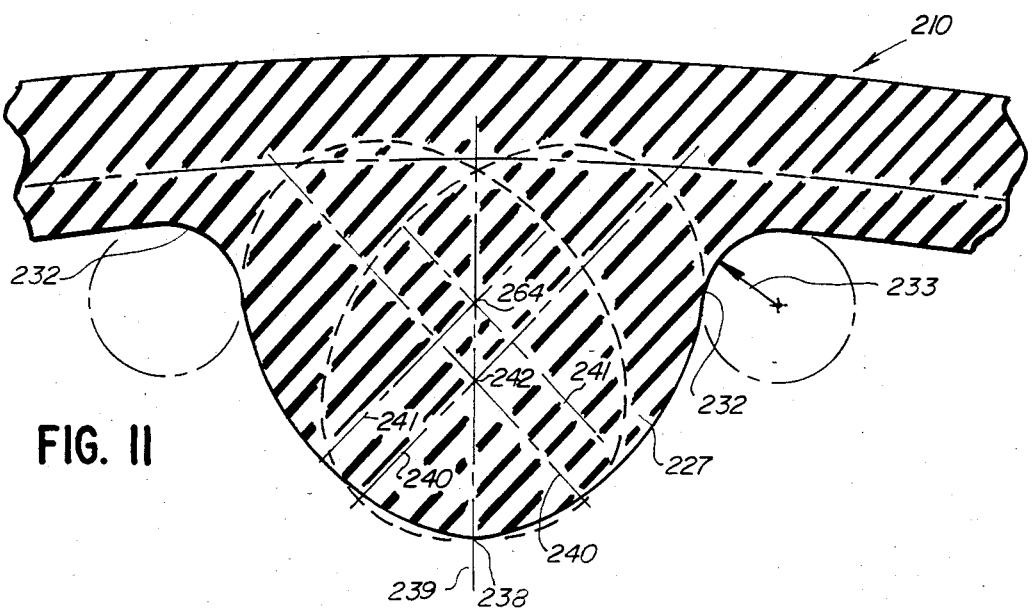
FIG. 11
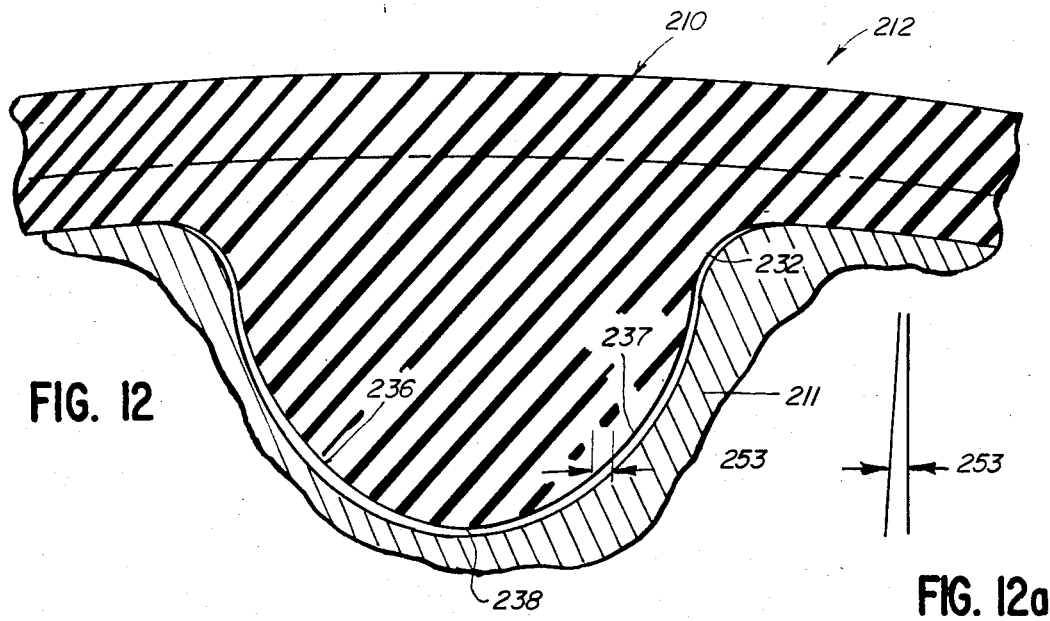
FIG. 12
FIG. 12a

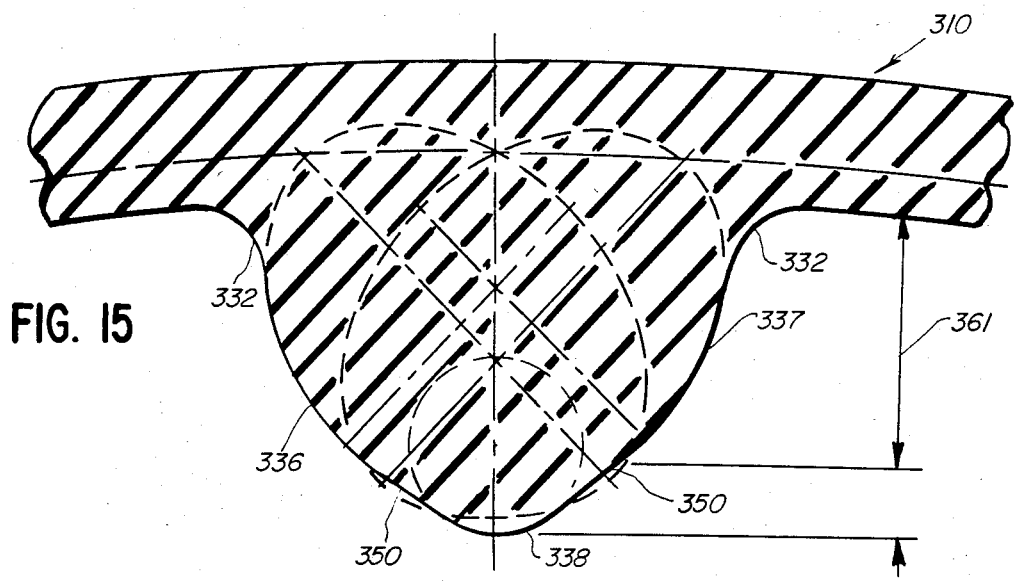
FIG. 15
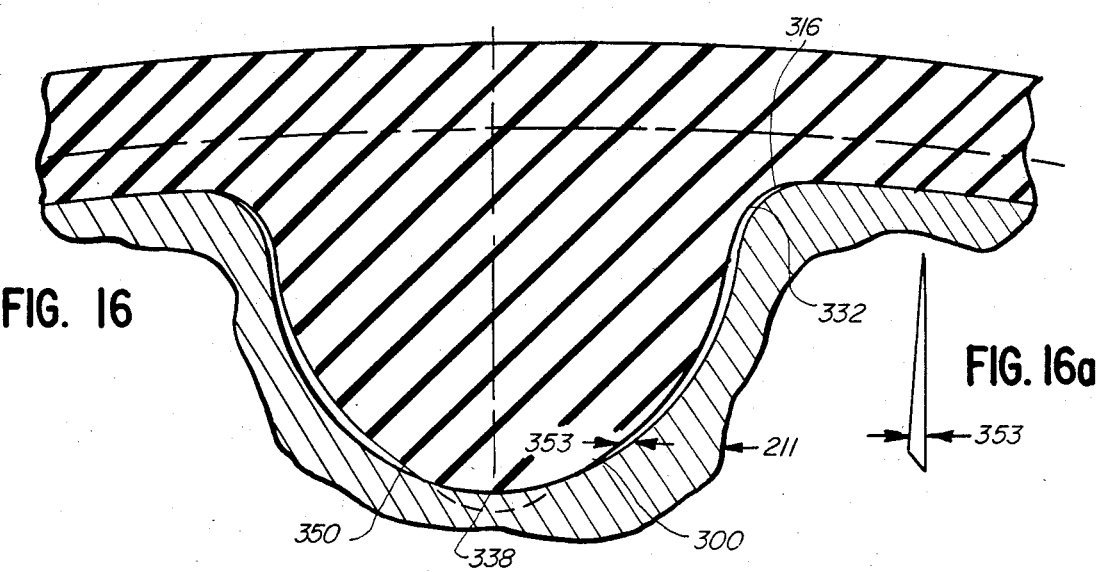
FIG. 16
FIG. 16a
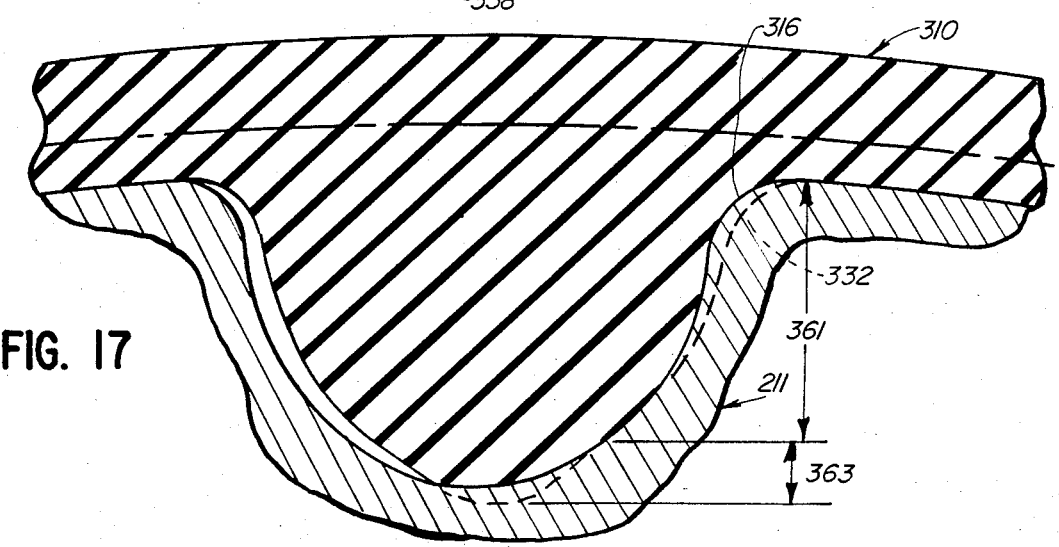
FIG. 17

TOOTHED DRIVE BELT

DESCRIPTION

1. Technical Field

This invention relates to drive means and in particular to toothed belt drives.

2. Background Art

In one form of belt drive, the pulley and belt are provided with complementary teeth whereby a positive displacement drive is obtained somewhat in the manner of a chain belt. A problem arises in the conventional toothed belt drives in that stress concentrations generated in the belt teeth tend to cause cracking of the teeth from the belt body, limiting the useful life of the belt.

In the known toothed belts, a substantial backlash between the belt tooth flank and the pulley surface occurs in operation, resulting in undesirable frictional engagement between the belt and pulley, subjecting the belt to abrasion and shortening the useful life thereof. This problem is aggravated where the pulley is of relatively small diameter or where the pulley is reversely driven as a result of the substantial contact between the belt and pulley in such drive systems.

Another problem arising in connection with the known toothed belt drive systems is the problem of noise resulting from the sudden contact between the belt teeth and pulley grooves.

A conventional drive means utilizing cooperating toothed belt and pulley comprises such a system defined by the Rubber Manufacturers Association IP-24, 1978. This specification characterizes the drive system as including a toothed belt having a trapezoidal cross-sectioned tooth, with the pulley groove having a complementary or similar cross section. As indicated above, such conventional drive means produces substantial shearing tending to crack the belt at the tooth root, or flank. In such a system, the tooth face is free of load so that this portion of the belt teeth serves no useful function. In such conventional drive systems, the load is transmitted nonuniformly from the belt tooth to the tension member of the belt. Further, in such drive systems, the belt tooth face interferes with and has wearing engagement with the sides of the pulley tooth.

One attempted solution to the problem is the belt construction illustrated in U.S. Pat. No. 3,756,091. As shown therein, the tooth of the belt is defined by intersecting circular arcs defining a contour similar to the 1/2-th isochromatic fringe. As shown therein, the pulley groove is a conjugated circular arc groove. It has been found that this drive system presents a serious problem in that the backlash between the belt tooth flank and the pulley is very large. Thus, the moving range of the belt or pulley is substantially increased, causing the belt groove surface to be engaged and abraded by the pulley. This further results in damage to the tension member of the belt, thereby further shortening the useful life of the belt.

Another prior art drive system is illustrated in U.S. Pat. No. 4,233,852. As shown therein, only the tip of the belt tooth face is allowed to engage with the confronting surface of the pulley groove. This is effected by dimensioning the belt tooth to have a height greater than the pulley groove depth. This effectively prevents the pulley teeth from engaging the belt grooves, thereby reducing wear at this portion of the belt and further, reduces noise resulting from contact between the pulley tooth and the belt groove portion. However, such a drive system has the serious defect of substantial cracking of the teeth and flank portions after only limited use of the belt. More specifically, the backlash between the belt and pulley is greatest at the belt tooth flank and center and is at a minimum at the belt tooth face. Thus, compressive stresses in the belt teeth increase from the center of the teeth toward the face thereof so that when the belt teeth move away from the pulley in the operation of the drive system, the tooth face turns while a gradually increasing force acts against the belt tooth sides, causing a shearing force to act against the tooth, tending to separate the tooth from the belt body, causing cracking of the tooth flank portions.

DISCLOSURE OF INVENTION

The present invention comprehends an improved drive means having a novel toothed belt and pulley construction which eliminates the disadvantages and problems of the above described prior art structures in a novel and simple manner.

More specifically, the invention comprehends the provision of improved toothed belt/pulley drive means wherein the backlash between the pulley and belt increases linearly from the belt tooth flank its tip face so that stresses generated in the belt teeth by the engagement thereof with the pulley are gradually reduced toward the belt tooth flank.

The invention further comprehends such an improved drive means wherein the pulley tooth face turns relative to the belt teeth while providing a small force gradually to the belt tooth sides as the belt moves away from the pulley. The construction is arranged so that interference of the belt teeth with the pulley teeth is minimized, thereby effectively preventing early cracking of the belt tooth flank.

The improved drive means further effectively prevents jumping of the belt from the pulley under high torque transmission conditions.

More specifically, the invention comprehends the provision of such an improved drive means including a pulley having an annular belt-engagement groove defined by an annular series of alternating grooves and teeth, each of the grooves being defined in cross section by a circular arc defining the root of the grooves and having opposite outer ends, a pair of straight lines extending one each outwardly from the opposite outer ends of the root arcs and having outer distal ends, and a pair of circular entrance arcs exteriorly one each outwardly from the distal ends of the straight lines, the teeth between the grooves having tip surfaces, each tip surface being defined by a straight line interconnecting opposed ends of the circular entrance arcs of the grooves at the opposite sides of the tooth, and a drive belt having a series of alternating grooves and teeth at a constant pitch, each belt tooth being defined in cross section by a tip face defined by a pair of elliptical arcs meeting at the centerline of the tooth and defining outer ends, the long axes of the ellipses defining the elliptical arcs being at equal and opposite angles to the centerline of the tooth, and opposite flanks defined by outturned circular arcs extending one each from the outer ends of the elliptical arcs, backlash between the belt teeth and the pulley grooves in static engagement increasing linearly from the belt tooth flank to the belt tip face.

In the illustrated embodiment, the angle of the ellipses to the tooth centerline is in the range of approximately 35° to 40°, and the eccentricity of the ellipses is in the range of approximately 0.6 to 0.9.

The improved drive means provides a backlash in the range of approximately 15″–10°.

In the illustrated embodiment, the portion of the belt tooth extending from the flank comprises approximately 60% to 90% of the total height of the tooth.

In one form, the tooth flanks further include a rectilinear portion between the outer end of the tip face arc and the circular flank arc.

The height of the pulley groove, in one illustrated embodiment, is substantially equal to the height of the belt tooth, and in another embodiment, the height of the belt tooth is approximately 2% to 15% greater than the height of the pulley groove.

The invention further comprehends provision of such a drive means wherein the pulley grooves are defined by a pair of elliptical arcs meeting at the centerline of the groove, with the major axes of the ellipses defining the elliptical arcs intersecting at an angle of approximately 70° to 90° and the eccentricity of the ellipses being approximately 0.6 to 0.9.

In the illustrated embodiment, the gradient of the tangential line at each point on the sidewall of the pulley groove is in the range of approximately 80° to 90° at the connecting point of the circular arc and ellipses of the pulley tooth face.

In the illustrated embodiment, the angle of intersection of the major axes of the ellipses of the belt teeth is smaller than the angle of intersection of the major axes of the ellipses of the pulley groove.

The invention comprehends the provision of such a drive means wherein the backlash is in the range of approximately 15″–10°.

The drive means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a sectional view of a pulley of a drive system embodying the invention illustrating the configuration of the teeth and groove thereof;

FIG. 2 is a sectional view of a belt of a drive system embodying the invention illustrating the teeth and groove thereof;

FIG. 3 is a sectional view illustrating the drive means utilizing the pulley of FIG. 1 and belt of FIG. 2;

FIG. 3a is a diagram illustrating the backlash relationship between the pulley and belt of FIG. 3;

FIG. 7 is a section illustrating in greater detail the backlash relationship between the pulley and belt of the drive system of FIG. 6;

FIG. 7a is a graphic diagram illustrating the backlash;

FIG. 8 is a section illustrating the arrangement of the belt relative to the pulley during driving operation of the drive means;

FIGS. 9a, 9b, 9c, and 9d are sections illustrating the successive dispositions of the belt and pulley as the belt moves from engagement with the driven pulley;

FIG. 10 is a section illustrating a further modified form of pulley for use in a drive system embodying the invention;

FIG. 11 is a section illustrating a modified belt for use with the pulley of FIG. 10;

FIG. 12 is a section illustrating the static engagement of the belt with the pulley of FIGS. 10 and 11;

FIG. 12a is a diagram illustrating the backlash relationship between the pulley and belt of FIG. 12;

FIG. 15 is a section of a further modified form of toothed belt embodying the invention adapted for use with the pulley of FIG. 10;

FIG. 16 is a section illustrating the backlash relationship between the pulley of FIG. 10 and toothed belt of FIG. 15;

FIG. 16a is a diagram illustrating the backlash relationship between the pulley and belt of FIG. 16; and FIG. 17 is a section illustrating the distribution of lateral pressure between the belt of FIG. 15 and pulley of FIG. 10.

BEST MODE FOR CARRYING OUT THE INVENTION

Figure 4:
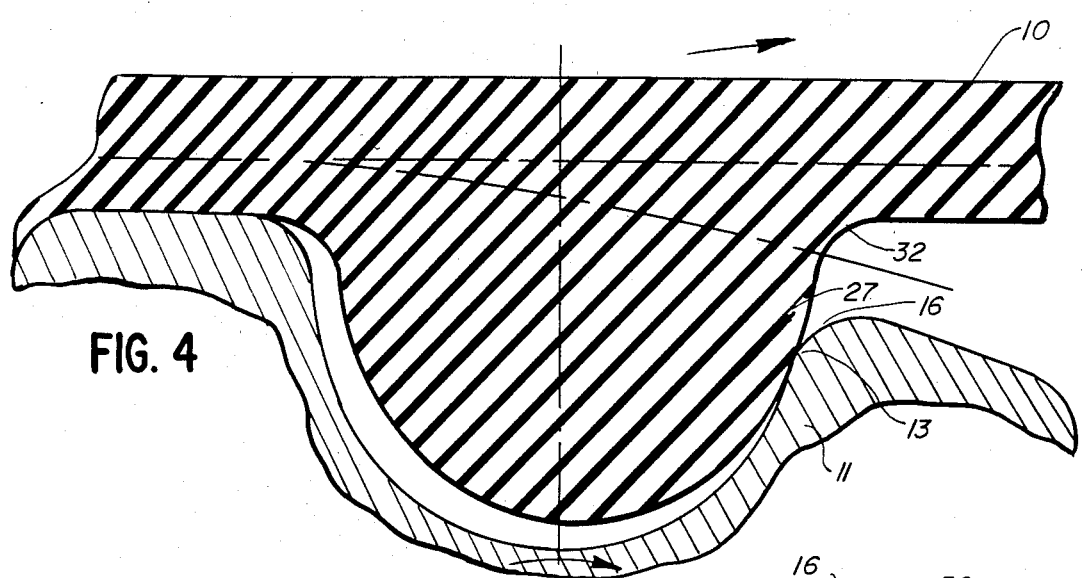
FIG. 4 is a sectional view illustrating the relationship of the belt and pulley at a position wherein the belt is moving away from the pulley.

In the illustrative embodiment of the invention as disclosed in FIGS. 1–5, a toothed belt generally designated 10 is adapted for use with a pulley generally designated 11 to cooperatively define a drive means, or system, 12. As shown in FIG. 1, the pulley 11 is defined by annularly spaced, circumferential teeth 13 and grooves 14. Each tooth 13 is defined in section by a distal, rectilinear portion 15 and opposite circular entrance arcs 16.

As further shown in FIG. 1, each groove 14 of the pulley is defined as a circular arc having a center 17 on the centerline 18 of the pulley groove. The groove arc 14 has a radius 19 from center 17, as shown in FIG. 1. Groove center 17 lies on a line 20 extending perpendicular to centerline 18 and the centers 21 of the pulley tooth arcs 16 lie on line 20, as shown in FIG. 1. Resultingly, the height of the pulley groove 14 is the sum of the radius 19 of arc 14, and the radius 16a of the arcs 16. In the illustrated embodiment, the length of radius 19 is approximately three times the length of radius 20.

As further illustrated in FIG. 1, the outer distal end 22 of arc 14 is connected to the inner distal end 23 of the arc 16 by a rectilinear line 24. The lines 24 at opposite sides of the groove extend at equal and opposite angles to centerline 18, with the angle 25 between the lines 24 being in the range of approximately 15° to 20°. As will be obvious to those skilled in the art, the length of the rectilinear line 24 is a function of the radii of curvature 19 and 16a of arcs 14 and 16, respectively.

Belt 10, as shown in FIG. 2, includes a belt body 26 provided at longitudinally spaced intervals with teeth 27 alternating with grooves 28. The teeth and grooves are at a constant pitch in the longitudinal direction of the belt. The belt body may be provided with a conventional tensile cord portion 29 formed of suitable material, such as glass fiber, polyester fiber, aramid fiber, etc., and which is located on the belt pitch line 30.

The configuration of the teeth 27 are coordinated with the configuration of the pulley grooves 14. As shown in FIG. 2, each tooth is defined by opposite flanks 32, which, in section, are defined by circular arcs having a radius of curvature 33 centered on center points 34.

Each tooth is further defined by a tip face portion generally designated 35 which, in turn, is defined by a pair of elliptical arcs 36 and 37 centered on a center point 31. Arcs 36 and 37 meet at a point 38 on the centerline 39 of the tooth. Elliptical arc 36 defines a long axis 40 and a short axis 41 which intersect at a point 42 spaced from the centerline 39 a distance 43.

Each of the belt grooves 28 is defined in section by a rectilinear root line 44 extending between the distal ends 45 of the opposed tooth flanks 32. The root lines 44 of the adjacent grooves define a line 46. The ellipse point 42 is spaced inwardly from line 46 by a distance 47 substantially equal to the radius of curvature 33 of the flank arcs 32.

The major axis 40 of the two elliptical arcs 36 and 37 intersect at an angle 48. The major axes of the ellipses intersect at a point 49 on the centerline 39 of the tooth, whereby the tooth is symmetrically arranged relative to its centerline.

Similarly to the groove 14 configuration, each belt tooth includes, in section, a rectilinear portion 50 extending between the outer distal end 51 of the elliptical arc and the inner distal end 52 of the entrance arc 32. Thus, backlash between the tooth and pulley groove wall, when the belt is statically engaged with the pulley, increases linearly from the flank entrance arc 32 to the tip, or center point 38, as illustrated in FIG. 3a. In the illustrated embodiment, the pitch of the backlash is approximately 15''-10°. The backlash 53, as shown in FIG. 3 and FIG. 3a, increases linearly to the tip 31.

The angle 54 between the linear portions 50 of the tooth sides is preferably approximately 15''-10° greater than the angle 25 of the pulley groove rectilinear portions 24. The radius of curvature 33 of the belt entrance flanks 32 is preferably in the range of approximately 0 to 2% more than the radius of curvature 16a of the pulley teeth arcs 16.

It has been found that a drive system 12 utilizing the above described pulley and belt configurations provides improved long, troublefree life as a result of the stress generated in the belt teeth as the belt teeth move away from the pulley, becoming gradually smaller from the belt tooth tip 31 to the flank portions 32. Thus, as shown in FIG. 4, as the belt 10 moves away from the driven pulley 11 in the direction of the arrow, only a small engagement between the belt tooth 27 and the pulley tooth 13 exists, whereby only a small force is applied gradually from the pulley tooth face to the belt tooth, minimizing any shearing force acting on the belt tooth flanks tending to separate the teeth from the tension member. Resultingly, cracking of the teeth at the root is effectively avoided and smooth disengagement of the belt from the pulley is provided. In the prior art, as discussed above, the compressive stresses in the teeth increase toward the tip of the tooth, the tooth flank is subjected to increasing shearing force, causing rapid fatigue of the belt tooth flank and resulting cracking failure.

Figure 5:
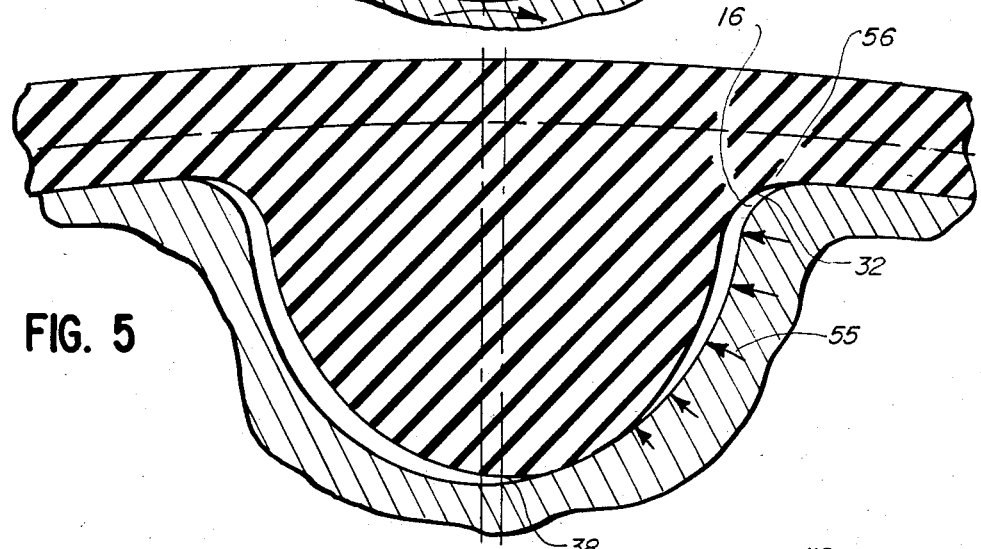
FIG. 5 is a section illustrating the development of lateral pressure forces developed in operation of the drive system.

FIG. 5 illustrates the lateral pressure forces 55 acting between the pulley and belt tooth which decrease gradually from the belt tooth flank 32 to the tip 31, i.e. inwardly from the deformed portion 56 of the belt.

Thus, the drive system 12 utilizes a pulley groove having a generally circular section groove and a belt having a novel elliptical arc tooth configuration cooperatively providing an increase in backlash between the belt and pulley linearly from the belt tooth flank toward the tooth tip, whereby stress is generated in the belt teeth when the belt is driven are minimized and reduced gradually from the belt tooth flank toward the tip. Resultingly, the stresses generated on the teeth are minimized, and in particular, are minimized at the belt tooth flank where cracking conventionally occurs in the belts of the prior art. Further, the improved cooperative structural arrangement assures smooth disengagement of the belt from the pulley, further extending the useful life of the belt.

Figure 6:
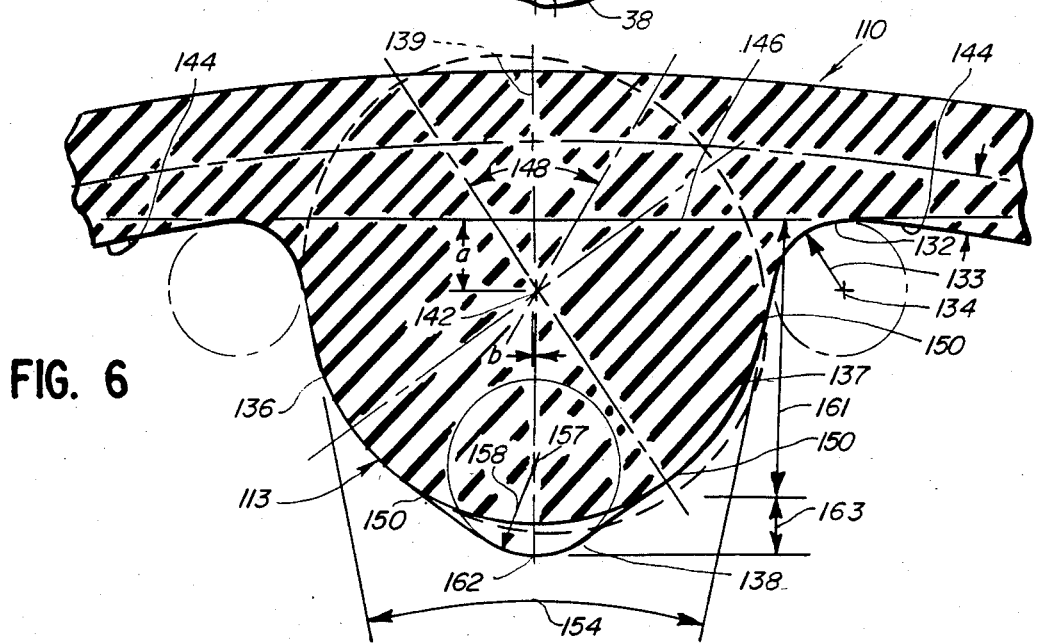
FIG. 6 is a section illustrating a modified drive system embodying the invention.
Figure 13:
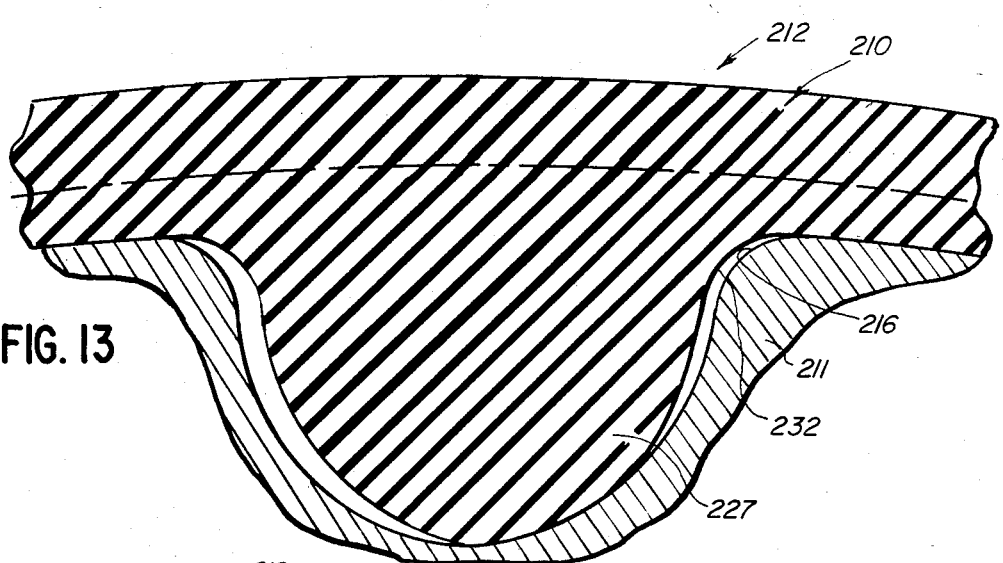
FIG. 13 is a section illustrating the distribution of lateral pressure resulting from the engagement of the belt with the driven pulley of FIGS. 10 and 11.
Figure 14A:
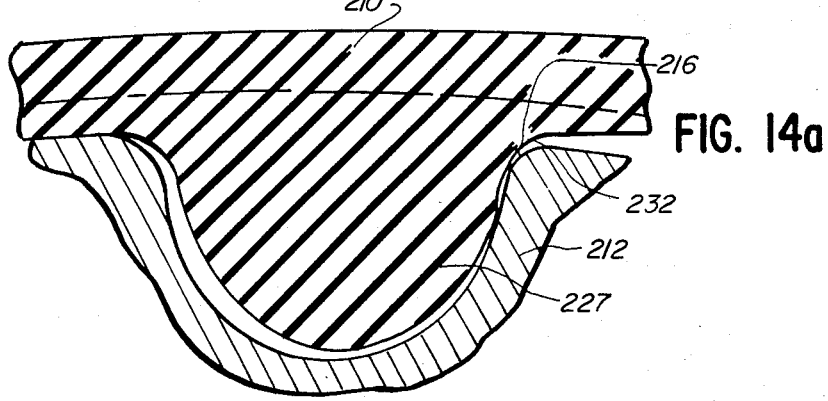
FIGS. 14a, 14b and 14c are sections illustrating successive dispositions of the belt relative to the driven pulley as the belt leaves the pulley.
Figure 14B:
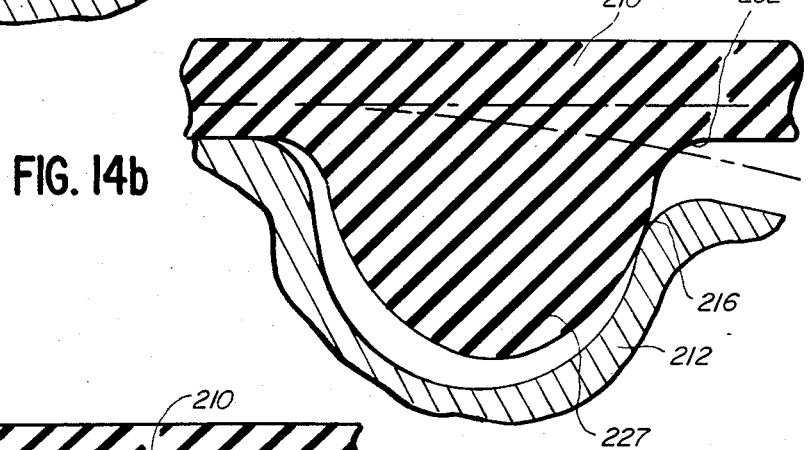
Figure 14C:
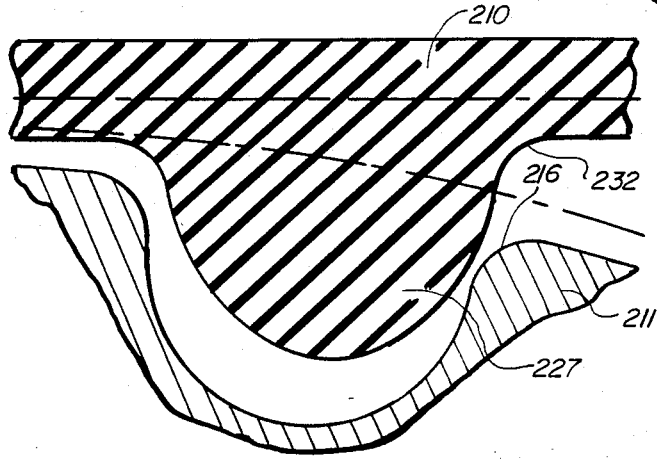

Referring now to FIG. 6, a modified form of belt generally designated 110 is provided for use with the pulley 11 of FIG. 2. Belt 110 differs from belt 10 in the provision of a circularly arcuate tip portion 131, having its center of curvature 157 on the centerline 139 of the tooth and defining a radius of curvature 158. The circularly arcuate portion 138 is joined to the elliptical arcuate portions 136 and 137 by rectilinear portions 159 and 160, respectively.

The first region of the tooth extending from the line 146 between the groove rectilinear portion 144 of the adjacent belt grooves to the distal inner end of the elliptical arcs 136,137 has a length 161 and the distance between the distal end of the arcuate portions 136 and 137 and the tangent to the arcuate portion 158 at the tip 162 comprises a length 163. Dimension 161 represents approximately 60% to 90% of the total tooth height from line 146 to tip 162.

The sides of the teeth within the dimension 161 receive lateral pressure from the pulley groove sidewall in the operation of the drive means. As can be seen in FIG. 6, the first portion defined by length 161 includes the flank portion defined by the radius 133 of the arcuate portion 132, the rectilinear portion 150, and the elliptical arc 136 or 137. The portion of the pulley tooth defined by the length 163 contacts the root of the pulley groove.

FIG. 7 illustrates the association of the belt with the pulley in the static engagement condition of the drive system. As shown therein, the backlash 164, i.e. the transverse facing between the tooth and the pulley groove surface perpendicular to the centerline 139, increases linearly in the region defined by the elliptical arc 136,137 and decreases gradually in the region defined by the rectilinear portion 160 and circularly arcuate portion 138. The gradient of the backlash in the portion defined by the elliptical arc is approximately 15''-10°, and preferably, 1°-4°. In the embodiment of 7, the total belt tooth height is preferably in the range of 0 to 15% greater than the pulley groove depth so as to assure that the belt tooth is disposed in positive engagement with the root of the pulley groove. In the illustrated embodiment, the radius of curvature 133 is preferably in the range of 0% to 20% smaller than the radius of curvature 158 of the circularly arcuate portion 138 defining the pulley tooth face tip portion.

As shown in FIG. 8, the lateral pressure of the pulley groove wall surface against the pulley tooth increases gradually from the belt tooth flank 132 along the length 161. The portion of the tooth along the length 163 receives pressure from the pulley groove root 114 rather than the sidewall of the groove. Thus, when the drive belt moves away from the driven pulley, the portion of the tooth defined by the length 161 receives only a small shearing force gradually from the pulley tooth so that the forces acting on the belt tooth flank tending to separate the tooth from the tension member are minimized.

In the illustrations of FIGS. 7, 8, 9a and 9b, the interference between the compressed portions of the belt and the pulley groove are shown in broken lines illustrating the areas of increased pressure between the belt and pulley. Thus, as seen in FIGS. 7, 8, 9a and 9b, the projecting arcuate portion 138 is compressed by its engagement with the circularly arcuate root portion of the pulley groove and, thus, is under radial pressure in the operation of the drive system. As further shown in FIGS. 8, 9a and 9b, the portion of the tooth engaging the arcuate surface 16 of the pulley is under pressure and is compressed during the operation of the drive system, as shown by the broken lines therein.

The interference between the projecting portion 138 of the belt and the root of the pulley groove causes the belt surface 115 to be in light contact with the pulley tooth surface 44 so as to avoid abrasion therebetween. Further, as the arcuate portion 138 is brought into contact with the pulley groove root portion, it is deformed flexibly so as to minimize tapping noise between surface 115 and 44.

Thus, the invention comprehends forming the belt tooth so as to effectively define two regions performing different functions. The first region defined by the length 161 extends for approximately 60% to 90% of the belt tooth so as to minimize the lateral pressure increase on the tooth from the tooth center toward the face of the tooth and minimize the tendency of the tooth flank to crack in operation. Where the region of the tooth defined by length 161 is greater than 90% of the total length, it is difficult to define the region defined by the length 163 properly to perform the desired radial pressure control function.

The unique configuration of the tooth 113 in cooperation with the pulley groove provides the improved functioning discussed above. As indicated, not only does the improved cooperative relationship between the disclosed tooth and pulley groove provide for minimized stress concentrations tending to crack the tooth root, but also permits a facilitated disengagement of the belt from the pulley in the operation of the drive system. Further, the arrangement provides for minimum tapping noise in the operation of the drive system and minimum abrasion of the belt groove root by the distal end of the pulley teeth. Overall, the belt system provides substantially improved efficiency and long, troublefree life over the structures of the prior art.

Referring now to the embodiment of FIGS. 10–14c, the invention comprehends the use of a modified form of pulley generally designated 211. As shown in FIG. 10, the pulley groove is defined in cross section by a flank portion 232 comprising a circular arc having a radius of curvature 220 and centered on a point 221. The root of the groove is defined by a pair of elliptical arcs 214a and 214b. The arcs are defined by ellipses having the major axes thereof 240 intersect on the centerline 239 of the groove. As shown, the minor axes 241 also intersect at a point 264 on the centerline. The included angle 248 between the major axes, in the illustrated embodiment, is 90°, the angle 248 preferably being in the range of approximately 70° to 90°. The ratio of the length of the major axes to the minor axes is in the range of approximately 1 to 0.6 to 0.9, and in the illustrated embodiment, is 1 to 0.8.

As shown in FIG. 10, the tangent 265 to the groove sidewall is substantially parallel to the centerline 239 at the distal end of the elliptical arc at its connection to the circular flank arc 232. The gradient of the tangent decreases toward the tip 238 of the pulley groove. Where the gradient angle is in the range of 80° to 90°, the force between the pulley groove and the belt is relatively large and acts generally in the horizontal direction. This gives the belt tooth a gripping relationship with the pulley so as to prevent the belt from jumping from the pulley in operation of the drive system. This effect increases with the amount of torque applied.

In the conventional drive system, the gradient in this region is relatively small, ranging from aproximately 60' to 80°, and there is a tendency for the belt to jump from the pulley in such known systems.

As a result of the elliptical configuration of the groove portions 214a and 214b, the curvature becomes smaller toward the tip 238, causing the high gradient region to become narrower and permitting facilitated separation of the belt tooth from the pulley.

A modified form of belt generally designated 210 for use with the pulley 211 is illustrated in FIG. 12. Belt 210 differs from belt 10 in the elimination of the rectilinear portions 51 interconnecting the circularly arcuate flanks and the elliptically arcuate face regions. Thus, as seen in FIG. 12, the belt teeth are defined by circularly arcuate flank portions 232 and the tooth face is defined by elliptically arcuate portions 236 and 237 corresponding to the surfaces in the belt 10. The backlash 253, as illustrated in FIGS. 12 and 12a in the static engagement of the belt with the pulley, increases linearly from the belt tooth flank 232 toward the belt tooth face 236,237. The gradient of the backlash 253 is generally 15"–10° and preferably at 1°–4°.

Thus, each of the belt tooth face and pulley groove root portions of the drive system 212 is defined by elliptical arcs. In the illustrated embodiment, the angle of intersection of the major axes of the belt arcs is approximately 2 degrees smaller than the angle of intersection of the pulley groove elliptical arcs. The backlash between the pulley groove sidewall and the belt tooth increases linearly from the belt tooth flank 232 to the belt tooth tip 238. The radius of curvature 233 of the belt tooth flank 232 is preferably in the range of 0% to 20% greater than the radius of curvature 220 of the pulley tooth flank.

As seen in FIG. 12, the backlash 253 decreases from the tooth tip to the flank 232, so that when the belt moves away from the driven pulley, only a small stress is applied to the pulley tooth face so as to minimize forces tending to shear the tooth from the belt body by attempting to turn the tooth during such disengagement. Resultingly, the tooth flank cracking is minimized and a smooth disengagement of the belt from the pulley is effected. As indicated above, this arrangement provides a substantial improvement over the prior art structures wherein the compressive stresses become greater toward the tooth flank.

As indicated above, the drive system 212 provides further improvement in the provision of the large gradient of the tangent to the tooth face in the high gradient region extending from the connection of the flank arc 232 to the pulley face arc 214a,214b, with the gradient becoming smaller toward the tip 266. Thus, the high gradient region is made relatively small and the belt toothed part requires gripping force preventing the belt from jumping from the pulley, as discussed above. The backlash between the pulley and belt increases linearly from the belt tooth flank toward the tip so that stresses generated in the belt tooth by the driven pulley are reduced gradually from the tooth flank to the tip, thereby decreasing stresses acting on the belt tooth when the belt moves away from the pulley so as to minimize cracking of the belt tooth flank in combination with the improved gripping force provided by the gradient control discussed above.

Referring now to the embodiment of FIGS. 15-17, another modified form of belt embodying the invention generally designated 310 is adapted for use with the pulley 211 of FIG. 10. Belt 310 is similar to belt 110 but omits the rectilinear portions 150 intermediate the flank portions 332 and the outer distal ends of the elliptical arc portions 336 and 337. The first region defined by the length 361, which extends approximately 60% to 90% of the total tooth height, and preferably in the range of 90% thereof. This region defined by the flank surface 332 and the face elliptical arc surface 336,336 receives lateral pressure from the pulley groove sidewall. As discussed above relative to belt 110, the projecting circularly arcuate tip portion is compressed against the root of the pulley groove, as indicated by the dotted lines in FIGS. 16 and 17. Further similarly to the belt 110, the circularly arcuate portion 338 may be connected to the elliptical arc portions 336 and 336 by straight line portions 350. The major axes of the tooth ellipses intersect each other at an angle preferably approximately 2 degrees smaller than the intersection angle of the pulley groove ellipses and the ratio of the length of the major axes to the length of the minor axes of the tooth ellipses is preferably smaller than the ratio of the length of the major axes to the minor axes of the pulley ellipses. As shown in FIG. 16a, the backlash 353 between the belt tooth and the pulley groove sidewall increases linearly from the belt tooth flank to the rectilinear portion 350, and then decreases rectilinearly to the tip 338. The gradient of the backlash is in the range of 15″-10°, and preferably in the range 1°-4°. The height of the belt tooth is in the range of 0% to 15% greater than the depth of the pulley groove to assure effectively positive contact between the tip of the belt tooth and the root of the pulley groove. The radius of curvature of the belt tooth flank 332 is preferably in the range of 0% to 20% greater than the radius of curvature of the pulley tooth entrance arc 316.

FIG. 17 illustrates the static engagement of the belt 310 with the pulley 211. The projecting tip portion 338 is compressed when the belt tooth is received in the pulley, as shown in dotted lines in FIGS. 16 and 17. Similarly, the flank portion of the belt tooth is compressed in the driving engagement of the pulley with the belt, as illustrated in broken lines in FIG. 17. It should be understood that in each of the above discussed figures illustrating the interference between the compressible belt portions and the pulley surfaces, the broken line showing illustrates where the belt portion would extend if it were not compressed by the engagement thereof and, thus, the broken line showings illustrate the amount of compression effected in the engagement of the belt with the pulley in the operation of the different drive systems as described.

Similarly, similar components of each of the different embodiments of the drive systems are identified by similar reference numerals, but 100 different. Other than as discussed relative to the respective modified embodiments, each of the drive systems functions in a similar manner and provides similarly the improved crack resistance and long, troublefree life comprehended generically by the invention. Each of the different drive systems further provides the improved noise elimination and faciliated withdrawal of the belt from the pulley, as discussed with respect to different embodiments. Each of the different embodiments provides improvement over the prior art structures in eliminating the undesirable cracking, noise, jumping of the belt from the pulley, abrasion of the belt groove root portions, and nonsmooth passing of the belt from the driven pulley.

The invention comprehends the provision of a cooperation between the belt teeth and pulley groove configuration so as to provide gradually increasing backlash from the belt tooth flank to a point adjacent the belt tip and a decrease of the backlash therefrom to the tip. Each of the embodiments provides improved control of the lateral pressure between the belt tooth and pulley groove surface so as to minimize cracking as discussed above. Each of the embodiments provides for a light engagement of the belt tip with the pulley groove root so as to effect the desired elimination of undesirable tapping noise. Each of the embodiments utilizes, in carrying out the invention, one or more elliptical arcuate portions of the belt teeth and pulley grooves, respectively. The elliptical arc portions of the drive components are coordinated with associated circularly arcuate portions and, in certain cases, with straight line portions, to provide the desirable results discussed above.

INDUSTRIAL APPLICABILITY

As indicated above, the intersection of the major axes of the ellipses defining the above discussed elliptical arcs is preferably in the range of 70° to 90°, and the ratio of the major axes to the minor axes of the ellipses is preferably in the range of 1:0.6-0.9. The pitch of the backlash is generally set at 15″-10° and preferably at 15″-1°-4°. Other parameters with respect to the different embodiments are discussed above.

It has been found that drive systems embodying the above described invention provide substantially improved results over the prior art structures, as discussed above. More specifically, running tests have been conducted on drive systems wherein the parameters were as set forth in the following Tables A and B:

TABLE A

|  | Tooth belt as shown in FIG. 2 | Tooth belt as shown in FIG. 6 |
| --- | --- | --- |
| Pitch | 9.525 mm | 9.525 mm |
| Number of teeth | 83 | 83 |
| Belt width | 19.1 mm | 19.1 mm |
| PLD | 0.686 mm | 0.686 mm |
| Tooth height HB (161) | 3.55 mm | 3.84 mm ($H_1$ = 3.15 mm $H_2$ = 0.69 mm) |
| Tooth angle ΘB (154) | 20° 30″ | 20° 30″ |
| angle Θb (48) between major axes | 86° 60′ | 86° 60′ |
| Radius R1 (33) | 0.85 mm | 0.85 mm |
| Radius R2 (158) | — | 1.00 mm |
| Dimension (a) from crossing point of the major axis and the minor axis to the tooth surface | 0.84 mm | 0.84 mm |
| Dimension (b) from crossing point of the major axis and the | 0.01 mm | 0.01 mm |

TABLE A-continued

| | Tooth belt as shown in FIG. 2 | Tooth belt as shown in FIG. 6 |
|---|---|---|
| minor axis to the tooth belt center line elliptical formula | $1.109X^2 + 0.902Y^2 = 7.289$ | $1.109X^2 + 0.902Y^2 = 7.289$ |

TABLE B

| | pulley as shown in FIG. 1 | pulley as shown in FIG. 10 |
|---|---|---|
| Groove Depth Hp | 3.55 mm | 3.55 mm |
| Pitch | 9.525 mm | 9.525 mm |
| ΘP (25) | 18° 20' | 18° 20' |
| | r(19) = 2.70 mm | Rp = 0.9 mm Θp = 90 |
| | r(20) = 0.83 mm | a = 1.33 mm |
| | α(20a) = 9° 10 | b = 0.475 mm |
| | d(21a) = 2.37 mm | elliptical formula $1.665X^2 + 1.0101Y^2 = 6.25$ |

In the belt running test, the drive pulley is provided with eight teeth, and the driven pulley was provided with 36 teeth. A tension pulley having a 52 mm diameter was engaged with the backside of the belt in the conventional manner. The test was run with the driving pulley operating at a speed of 7200 rpm, with a load on the belt of 8 ps, and at an ambient temperature of 80° C.

For comparison purposes, a belt of the prior art structure was utilized having a pitch of 9.525 mm, 83 teeth, a belt width of 19.1 mm, a tooth height of 2.29 mm, a tooth angle of 40°, and PLD of 0.686 mm. The pulley used trapezoidal teeth. The pulley had a pitch of 9.525 mm, a groove depth of 2.59 mm, and a groove angle of 40°.

The results of the running test utilizing the belts and pulleys described above are set forth in the following Table C:

TABLE C

| | Pulley Type | | |
|---|---|---|---|
| | FIG.1 Pulley | FIG.10 Pulley | Known belt Pulley |
| Belt Type | | | |
| FIG.2 Belt | 930 hrs | 1050 hrs | cannot engage |
| FIG.6 Belt | 995 hrs | no test | cannot engage |
| Known Belt | cannot engage | cannot engage | 500~600 hrs |

The running time hours shown in Table C indicate the length of time the belt was run before the belt was broken at the tooth root and, thus, represents the useful life of the belt.

Thus, it can be seen that the novel drive system of the present invention provides substantial improvement in the long, troublefree life of the toothed belt, while concurrently providing the other improved functioning discussed above.

The foregoing disclosure of specific embodiments is illustrative of the broad inventive concepts comprehended by the invention.

I claim:

1. Drive means comprising:
    a pulley having a radially outwardly opening belt-engagement groove defined by an annular series of alternating grooves and teeth, each of the grooves having an inner root being defined in cross section by a circular arc defining said root of the grooves and having opposite outer ends, a pair of straight lines extending one each outwardly from said opposite outer ends of the root arcs and having outer distal ends, and a pair of circular entrance arcs extending one each outwardly from said distal ends of the straight lines, the teeth between said grooves having tip surfaces, each tip surface being defined by a straight line interconnecting opposed ends of the circular entrance arcs of the grooves at the opposite sides of the tooth; and
    a drive belt having a longitudinally extending series of alternating grooves and teeth at a constant pitch, each belt tooth defining a centerline and being defined in longitudinal cross section by a tip surface defined by a pair of elliptical arcs meeting at said centerline of the tooth and defining outer ends, said elliptical arcs defining elipses having long and short axes, the long axes of the ellipses defining the elliptical arcs being at equal and opposite angles to the centerline of the tooth, and opposite flanks defined by circular arcs extending one each from the outer ends of the elliptical arcs, said pulley grooves and belt teeth comprising means for causing backlash between said belt teeth and said pulley groove in static engagement to increase linearly from the belt tooth flank to the belt tip face.

2. The drive means of claim 1 wherein the angle of the ellipses to said tooth centerline is in the range of approximately 35° to 45°.

3. The drive means of claim 1 wherein each said ellipsis defines an eccentricity and the eccentricity of said ellipses is in the range of approximately 0.6 to 0.9.

4. The drive means of claim 1 wherein the backlash is in the range of approximately 15"–10°.

5. The drive means of claim 1 wherein the portion of the belt tooth extending from said flanks comprises approximately 60% to 90% of the total height of the tooth.

6. The drive means of claim 1 wherein each of said tooth flanks further includes a rectilinear portion between the outer end of the tip face arc and the circular flank arc.

7. The drive means of claim 1 wherein the portion of the belt tooth extending from said flanks comprises approximately 60% to 90% of the total height of the tooth and each of said tooth flanks further includes a rectilinear portion between the outer end of the tip face arc and the circular flank arc, the height of said pulley groove being substantially equal to the height of the belt tooth.

8. The drive means of claim 1 wherein the portion of the belt tooth extending from said flanks comprises approximately 60%–90% of the total height of the tooth, and each of said tooth flanks further includes a rectilinear portion between the outer ends of the tip face arc and the circular flank arc, the height of the belt tooth being approximately 2% to 15% greater than the height of the pulley groove.

9. Drive means comprising:
    a pulley having a radially outwardly opening belt-engaging groove defined by an annular series of alternating grooves and teeth, each of the grooves being defined in circumferential cross section by a pair of elliptical arcs meeting at the centerline of the groove, said elliptical arcs defining ellipses having minor and major axes defining an eccentricity, the major axes of the ellipses defining said elliptical arcs intersecting at an angle of approximately 70° to 90°, the eccentricity of said ellipses being approximately 0.6 to 0.9, a pair of straight lines extending one each outwardly from said opposite outer ends of the root arcs and having outer distal ends, and a pair of circular entrance arcs extending one each outwardly from said distal ends of the straight lines, the teeth between said grooves having tip surfaces, each tip surface being defined by a straight line interconnecting opposed ends of the circular entrance arcs of the grooves at opposite sides of the tooth; and a drive belt having a longitudinally extending series of alternating grooves and teeth at a constant pitch, each belt tooth defining a centerline and being defined in longitudinal cross section by a tip face defined by a pair of elliptical arcs meeting at the centerline of the tooth and defining outer ends, and opposite flanks defined by outturned circular arcs extending one each from the outer ends of the elliptical arcs, said pulley grooves and belt teeth comprising means for causing backlash beween said belt teeth and said pulley groove in static engagement to increase linearly from the belt tooth flank to the belt tip face.

10. The drive means of claim 9 wherein the angle of the tangential line at each point on the sidewall of said pulley groove is in the range of approximately 80° to 90° at the connecting point of the circular arc and ellipses of said pulley tooth face.

11. The drive means of claim 9 wherein the angle of intersection of the major axes of the ellipses of said belt teeth is smaller than the angle of intersection of the major axes of the ellipses of said pulley groove.

12. The drive means of claim 9 wherein said drive means comprises means for providing a preselected backlash in the range of approximately 15"–10°.

13. The drive means of claim 9 wherein the portion of said belt teeth defined by said circular arcs and elliptical arcs comprises approximately 60%–90% of the height of the belt teeth.

14. The drive means of claim 9 wherein said drive means comprises means for providing a preselected backlash between said belt teeth and said pulley grooves in the static engagement which increases from the belt tooth flank and decreases toward the belt tooth tip face.

15. The drive means of claim 9 wherein the height of said belt tooth is substantially equal to the height of said pulley groove.

16. The drive means of claim 9 wherein the height of said belt tooth is in the range of approximately 2%–15% greater than the height of said pulley groove, whereby the belt comes in close contact with the pulley groove surface.

17. The drive means of claim 9 wherein said drive means comprises means for providing a preselected backlash between said belt teeth and said pulley grooves in the static engagement which increases from the belt tooth flank and decreases toward the belt tooth tip face.

18. The drive means of claim 13 wherein the height of said belt tooth is substantially equal to the height of said pulley groove.

19. The drive means of claim 13 wherein the height of said belt tooth is in the range of approximately 2%–15% greater than the height of said pulley groove, whereby the belt comes in close contact with the pulley groove surface.

* * * * *